(12) United States Patent
Kisor et al.

(10) Patent No.: US 6,266,773 B1
(45) Date of Patent: Jul. 24, 2001

(54) COMPUTER SECURITY SYSTEM

(75) Inventors: Gregory H. Kisor; Richard C. Calderwood, both of Portland, OR (US)

(73) Assignee: Intel. Corp., Santa Clara, CA (US)

( * ) Notice: Subject to any disclaimer, the term of this patent is extended or adjusted under 35 U.S.C. 154(b) by 0 days.

(21) Appl. No.: 09/223,807

(22) Filed: Dec. 31, 1998

(51) Int. Cl.$^7$ .................................................. G06F 11/30
(52) U.S. Cl. .................................................. 713/200
(58) Field of Search .................................. 713/200, 201; 714/25, 40, 47

(56) References Cited

U.S. PATENT DOCUMENTS

| | | | |
|---|---|---|---|
| 5,699,502 | * 12/1997 | Swanberg et al. | 714/24 |
| 5,867,646 | * 2/1999 | Benson et al. | 713/200 |
| 5,872,976 | * 2/1999 | Yee et al. | 717/4 |
| 5,937,159 | * 8/1999 | Meyers et al. | 713/201 |
| 5,974,149 | * 10/1999 | Leppek | 713/164 |
| 6,070,244 | * 5/2000 | Orchier et al. | 713/201 |
| 6,134,676 | * 10/2000 | VanHuben et al. | 714/39 |

* cited by examiner

Primary Examiner—Thomas M. Heckler
(74) Attorney, Agent, or Firm—Antonelli, Terry, Stout & Kraus, LLP

(57) ABSTRACT

A computer security system and method. An event detector detects events occurring in a monitored computer system, such as processor events, input events, and output events. A permission category list lists permission categories for events that might occur in the monitored computer system, and a decision maker determines action to be taken in response to detection of the event, based on the permission category of the event. The event detector might include an event list listing events to be detected, and the decision maker might include an action list listing action to be taken in response to different permission categories. If an event is not on the permission category list, the decision maker prohibits performance of the event, or alternatively issues a prompt to the computer user to specify action to be taken.

28 Claims, 5 Drawing Sheets

FIG. 6

| EVENT LIST | PERMISSION CATEGORY LIST | | | | | ACTION LIST | | | | | | | |
|---|---|---|---|---|---|---|---|---|---|---|---|---|---|
| | 1 | 2 | 3 | ... | N-1 | L | K | D | R | A | O | C | U |
| PROCESSING FUNCTIONS: | | | | | | | | | | | | | |
|    READING EMPLOYEE DIRECTORY FILE | 1 | | | | | 0 | 0 | 0 | 0 | 0 | 0 | 0 | 1 |
|    ... | | | | | | | | | | | | | |
|    DELETING FORMS DIRECTORY | | | | | 1 | 0 | 0 | 1 | 1 | 1 | 0 | 0 | 0 |
|    ... | | | | | | | | | | | | | |
| INPUT EVENTS: | | | | | | | | | | | | | |
|    DOWNLOAD INTERNET FILE | 1 | | | | | 0 | 0 | 0 | 0 | 0 | 0 | 0 | 1 |
|    INSTALL A PROGRAM FROM DISK | | | | 1 | | 0 | 0 | 1 | 1 | 0 | 0 | 0 | 0 |
|    ... | | | | | | | | | | | | | |
| OUTPUT EVENTS: | | | | | | | | | | | | | |
|    PRINTING ACCOUNTING RECORDS | | | | 1 | | 1 | 0 | 1 | 1 | 1 | 0 | 0 | 0 |
|    PRINTING USER FILE | 1 | | | | | 0 | 0 | 0 | 0 | 0 | 0 | 0 | 1 |
|    ACCESS PASSWORD LIST FILE | | | | 1 | | 0 | 0 | 1 | 1 | 0 | 0 | 0 | 0 |
|    ... | | | | | | | | | | | | | |

HISTORICAL EVENTS/PATTERNS:

USER X (PERMISSION CATEGORY = 2)
      PROGRAMS USED:
         - WORD PROCESSING; INTERNET BROWSER; CALENDAR
      DIRECTORIES VISITED:
         - C:\USER X  /S

PROGRAM Z
      DIRECTORIES VISITED
         - C:\PROGRAMZ  /S
         - C:\EMAIL  /S

SECURITY LOG/REPORT
   - USER X ATTEMPT TO ACCESS PASSWORD LIST FILE
   - PROGRAM Z ATTEMPT TO EMAIL ACCOUNTING RECORDS

COMPUTER SECURITY SYSTEM

FIELD

The present invention pertains to a computer security system which detects events in a monitored computer.

BACKGROUND

Computer security is a serious requirement, particularly in computer systems hooked up to a network, whether a local area network or a wide area network. Computers which are connected to the Internet have a particularly great need for a security system. A computer hacker might seek to obtain unauthorized access to a computer to tamper with programs or data or to read data, either as a prank or with the intention of gaining an economic advantage over persons authorized to have access to the computer system. An unauthorized employee might gain such access to confidential information of the employer. Even computers that are not networked can benefit from a security system to protect against unauthorized persons who might gain access to the computer when no one else is around.

Such an intruder might seek to launch a process within the computer, read or copy a file, delete a file, add, delete, or change data in a file, kill a process, introduce a virus or a Trojan horse, or do other mischief. Consequently, it is desirable to have a computer security system.

There exist computer security techniques which restrict access to material in the computer memory on a file by file or directory by directory basis. There also exist computer security techniques that limit access to files on a person by person or group by group basis, and other techniques that permit reading but not writing. However, these existing techniques are limited in their versatility and/or adaptability, for example merely denying access to files, without the ability to take other action.

SUMMARY OF THE INVENTION

The present invention includes a computer security system including a permission category list listing permission categories for different events which might occur in a monitored computer system. An event detector detects events occurring in the monitored computer system, and a decision maker determines action to be taken in response to detection of an event, based on the permission associated with the detected event.

BRIEF DESCRIPTION OF THE DRAWINGS

These and other aspects and advantages of the present invention are more apparent from the following detailed description and claims, particularly when considered in conjunction with the accompanying drawings. In the drawings:

FIG. 6 is an exemplary master file which may include an exemplary event list, permission list and action list.

DETAILED DESCRIPTION

Figure 2:
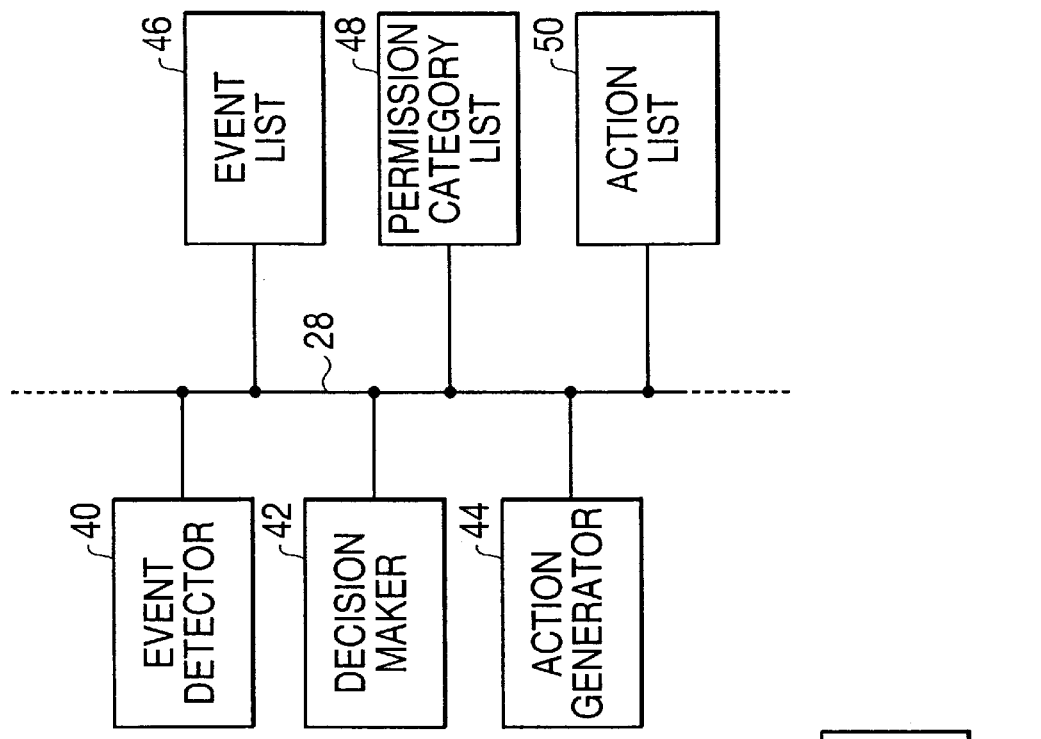
FIG. 2 is a more detailed block diagram of an exemplary computer security system which might be incorporated into the computer system of FIG. 1 in accordance with the present invention.

When appropriate, like reference numerals and characters are used to designate identical, corresponding or similar components in differing drawing figures.

Figure 1:
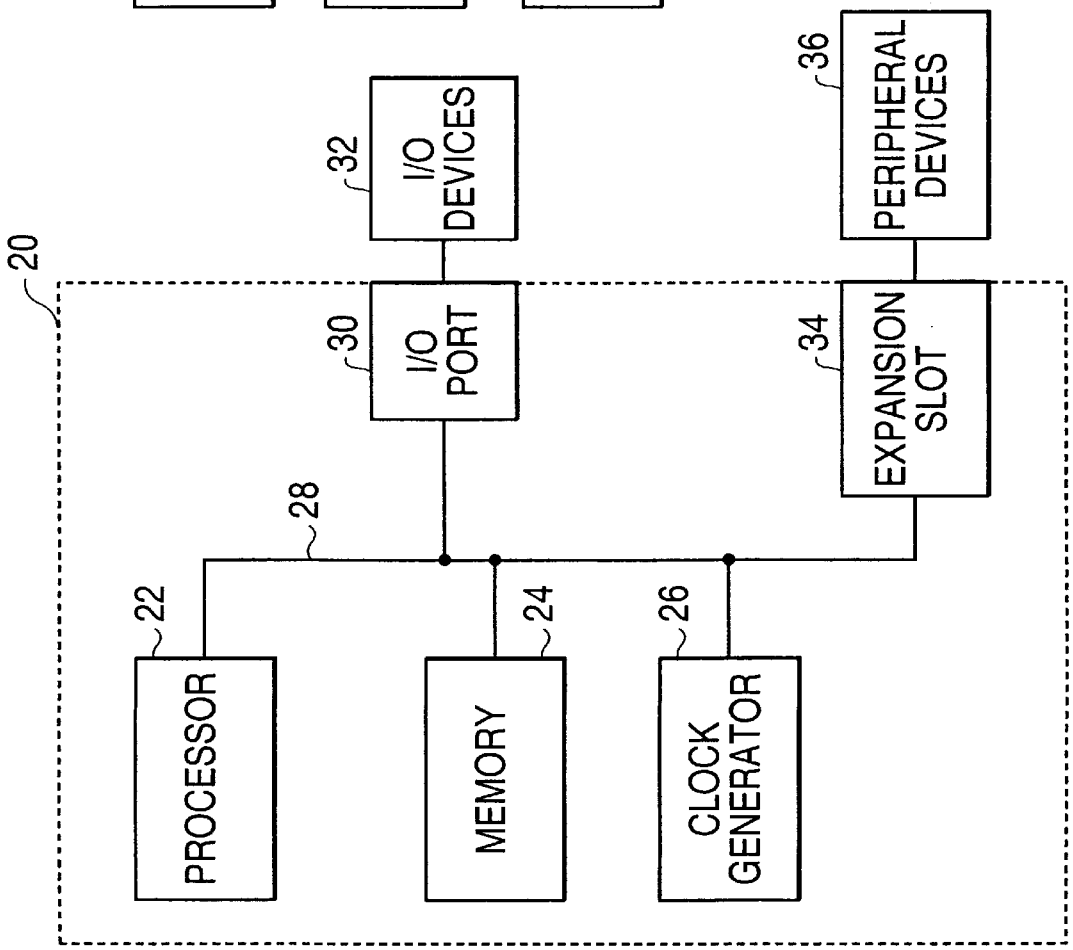
FIG. 1 is a block diagram of an exemplary computer system including an exemplary computer security system in accordance with the present invention.

FIG. 1 is a block diagram of an exemplary computer system 20 including a processor 22, a memory 24, and a clock generator 26 which are interconnected by a bus 28. Bus 28 is also connected to an input/output (I/O) port 30 and to one or more expansion slots 34 to permit connection of I/O devices 32 and other peripheral devices 36 to the computer system.

Processor 22 performs processing functions of the computer system, while memory 24 stores a program for controlling those processing functions, data for use in the processing functions and data resulting from the processing functions. Through I/O port 30 and expansion slot 34, I/O devices 32 and peripheral devices 36 input data for use in processing functions and commands for initiating processing functions, as well as outputting data resulting from processing functions. Clock generator 26 provides clock signals to control timing of the functions.

The program stored in memory 24 may cooperate with processor 22 to provide a computer security system, or alternatively, the computer security system may be provided in a form of a separately constructed add-on card. As depicted in FIG. 2, an exemplary embodiment of the computer security system may include an event detector 40, a decision maker 42, and an action generator 44, all of which are connected to bus 28, but the present invention is not limited to this or any other discussed configuration. In addition, the exemplary computer security system may include an event list 46, a permission category list 48, and an action list 50, all of which may be within a memory (e.g., memory 24) and are also connected to bus 28. Each of the event list 46, permission category list 48 and action list 50 may be provided as separate files, or alternatively, may be provided integrated together in a lesser number of files in any combination. FIG. 6 is illustrative of an exemplary master file which may have all of the foregoing files integrated therein, although the present invention is not limited to such illustrated file, or the information or configuration illustrated therein.

Event detector 40 may utilize the event list information to monitor for and detect events occurring in computer system 20. In an exemplary computer security system, these events may include processor events in which processor 22 performs processing functions, input events or output events in which I/O devices 32 and/or peripheral devices 36 seek to input data for use in processing functions, input commands for initiating functions, or output data resulting from processing functions. The present invention is not limited to such category or types of events.

Event detector 40 can detect all events occurring within computer system 20, if desired, i.e., if appropriately programmed or constructed. Alternatively, event list 46 may include a specific listing of detection events to be permitted such as shown in FIG. 6, while any event not listed is automatically prohibited. Alternatively, event list 46 may list detection events to be prohibited, while any event not listed is automatically permitted. Exemplary events which might be listed on event list 46 may include: reading a file from memory 24, copying a file in memory 24, deleting a file in memory 24, opening a new file in memory 24, adding, deleting or changing data in a file in memory 24, e-mail access to a spread sheet, launching a process, and killing a process.

The event list 46 may include listings at any level of granularity (i.e., any level of system detail) in the monitoring of computer security. For example, with regard to computer files, the event list 46 may contain coarse granularity items dictating computer security handlings with respect to large classes of users, events or items, e.g., "reading employee directory file" (shown in FIG. 6; allows all users to access such file), "download internet files (allows all users to download internet files)," etc. Alternatively, the event list 46 may contain fine granularity items dictating computer security handlings with respect to specific or smaller classes of users events or items, e.g., "deleting forms directory file" (shown in FIG. 6; pertains to a specific class of files), "access password list file" pertains to a specific file, etc. Further, the event list 46 may contain fine granularity items specific to individual users.

In addition to pre-programmed items, the computer security system may also be constructed to compile (i.e., self-learn) and monitor historical events or patterns via appropriate entries into the event list 46. For example, the computer security system may compile the computing habits, such as used programs, directory paths, commands, etc., of specific users or programs over time (i.e., historically) and store the same within an appropriate section of the event list 46 (see FIG. 6 example), and then monitor real time activity of a user or program to see whether the real time activity fits within the stored historical events or patterns. For example, if an active word processing package or active user suddenly attempts access to a system-wide password list file, and stored historical data indicates that such access had not been attempted before, then appropriate action may be taken (e.g., deny such activity, prompt user for password, report activity to a log or system administrator).

Note also with respect to the "Historical Events/Patterns" information in exemplary FIG. 6, "user X" has been designated as having a level 2 permission, i.e., "permission category=2". Such permission level may be assigned, for example, by a computer security system administrator, and may be stored as indicated within the "Historical Events/Patterns" information or any other suitable memory location.

When event detector 40 detects an event on event list 46, decision maker 42 determines whether the event is permitted. Permission category list 48 lists permission categories for different events. Action generator 44 then accesses action list 50 to determine the appropriate action for the permission category found in permission category list 48 for the detected event. Exemplary action includes permitting the event, denying the event, killing the process (i.e., preventing present and future executions, until a predetermined reset occurs), locking down the computer by shutting down the processor while maintaining the memory, activating an alarm, and reporting the event. A report might be stored in memory for later retrieval (see exemplary FIG. 6's, "security log/report") or sent to a system administrator, to a security office, to other users of the network, or to any other recipient who might use the report of the event. As one example with respect to FIG. 6, suppose that a user X attempts the event of "access password list file." User X only has a "permission category=2" designation, whereas the attempted event has a permission category list 48 designation of category "3". Therefore the computer system detects unauthorized activity, and action generator 44 performs the action list 50 actions of "D" (denying the activity), "R" (reporting the activity) (see FIG. 6's security log/report) and "A" (issue an alarm, such as a prompt to a display screen or audible output from a speaker). A similar unauthorized activity can be detected if a program, e.g., e-mail "program Z", suddenly attempts to access and then e-mail private accounting files back onto the internet.

In an exemplary computer security system in accordance with the present invention, decision maker 42 and permission category list 48 may alternatively operate in a manner similar to that of a spelling checker in a word processing program. That is, if a detected event is listed in permission category list 48, then decision maker 42 permits action compatible with the permission category given for the listed event, as found in action list 50. If the event is not listed in permission category list 48, then action generator 44 may lock down the monitored computer, or kill (e.g., permanently deny) the process. Alternatively, action generator list 44 may cause an output display prompting the person using the monitored computer to indicate the action to be taken, and may require the logged on user to provide a coded password to authenticate the user. In an exemplary computer system in accordance with the present invention, the permission category list and action list can be look up tables.

Event list 46, permission category list 48 and action list 50 can be files in memory 24. Actions on action list 50 might be maintained in the form of a digital byte (as shown in exemplary FIG. 6), with each bit associated with a particular action. The separate bits of an exemplary eight-bit byte (see FIG. 6 action list) might instruct that (1) the monitored computer is to be locked down "L", (2) the process is to be killed "K" (i.e., permanently denied), (3) performance of the event is to be denied "D" (i.e., prohibited with the present request), (4) the event is to be reported "R", (5) an alarm is to be sounded "A", (6) performance of the event is to be allowed one time only "O", (7) performance of the event is to be allowed for the current process only "C", and (8) performance of the event is always to be allowed "U" (i.e., unlimited). Although implementation of the invention is not limited to such exemplary logical value, a 1 in any bit position may direct that the associated action is to be taken. Such an action list might be provided in the form of a read-only memory.

Figure 3:
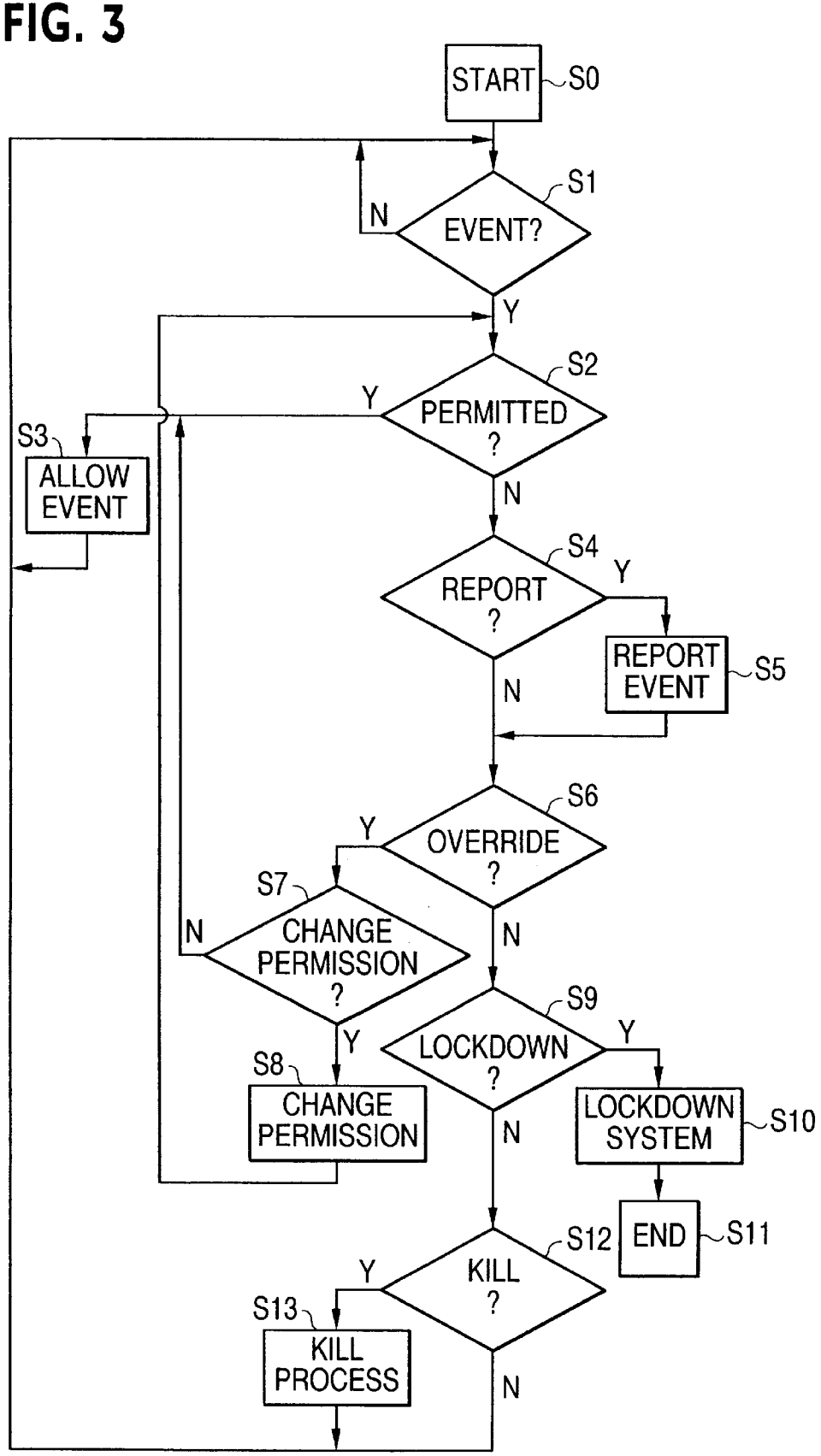
FIGS. 3–5 are flow charts of exemplary methods of operation of a computer security system in accordance with the present invention.

FIG. 3 is a flow chart of an exemplary method of operation of the computer security system as implemented by software. When computer system 20 is turned on or booted up, the security system starts at step S0. Then at step S1 the computer security system monitors the computer system until an event (e.g., keyboard input or command issued by a user, processing activity by the processor, etc.) is detected. Then in step S2 the security system determines whether it is a permitted event, as indicated in permission category list 48 (i.e., either using the pre-programmed list of events or historical events/patterns). If step S2 determines that it is a permitted event, then in step S3 the event is allowed and action is taken as indicated in action list 50, and the flow returns to step S1 to await the next event.

If step S2 determines that the event is not permitted, then in step S4, it is determined from the action list (bit "R") whether a report of the event should be generated. If so, then a report is generated and might be sent by e-mail, facsimile, or otherwise to a security administrator or other recipient or stored in a "security log/report" as shown in exemplary FIG. 6. Flow then proceeds to step S6. If step S4 determines that no report is to be generated, flow proceeds directly to step S6. In step S6 it is determined whether to override the lack of permission and to permit the event. Such an override can include providing a prompt to inquire whether to permit the event, with a response to the prompt requiring a coded password to authenticate the computer user. As one example, if an alleged user X is logged on and attempts an activity not indicated in the user X historical events/pattern data in the event list 46, the computer security system may prompt and require alleged user X to input a password (e.g., user X's general password or a user X's differing override password). If step S6 decides to override, then in step S7 a prompt can be made inquiring whether to change the permission category of the event so as to make the event a permitted event on permission category list 48. Again, this can be achieved by display of a prompt and receipt of instructions and a coded password. If it is decided (e.g., by a password-authorized user) to change the permission, then that change is made in step S8, for example by adding the event to user X's historical events/patterns in the event list 46. Then the flow returns to step S2 in which it is now determined that the event is permitted, and so in step S3 the event is allowed, and the flow returns to step S1. If step S7 determines that the permission is not to be changed, then the flow goes directly to step S3.

If step S6 results in not overriding the lack of permission for the event, then in step S9 it is determined from the action list (bit "L") whether the monitored computer system should be locked down by shutting it off. If so, then in step S10 the system is locked down, and in step S11 the process ends.

If step S9 determines that the system is not to be locked down, then in step S12 it is determined from the action list (bit "K") whether to kill the particular process underway. If so, then in step S13 that process is killed, and flow returns to step S1 to await a new event. If step S12 determines not to kill the process, then the flow returns directly to step S1 to await the next event, i.e., without the present event having been conducted.

Steps S3–S9 may be dictated by action list 50 after permission/non-permission is determined based on the permission category found in permission category list 48.

Figure 4:
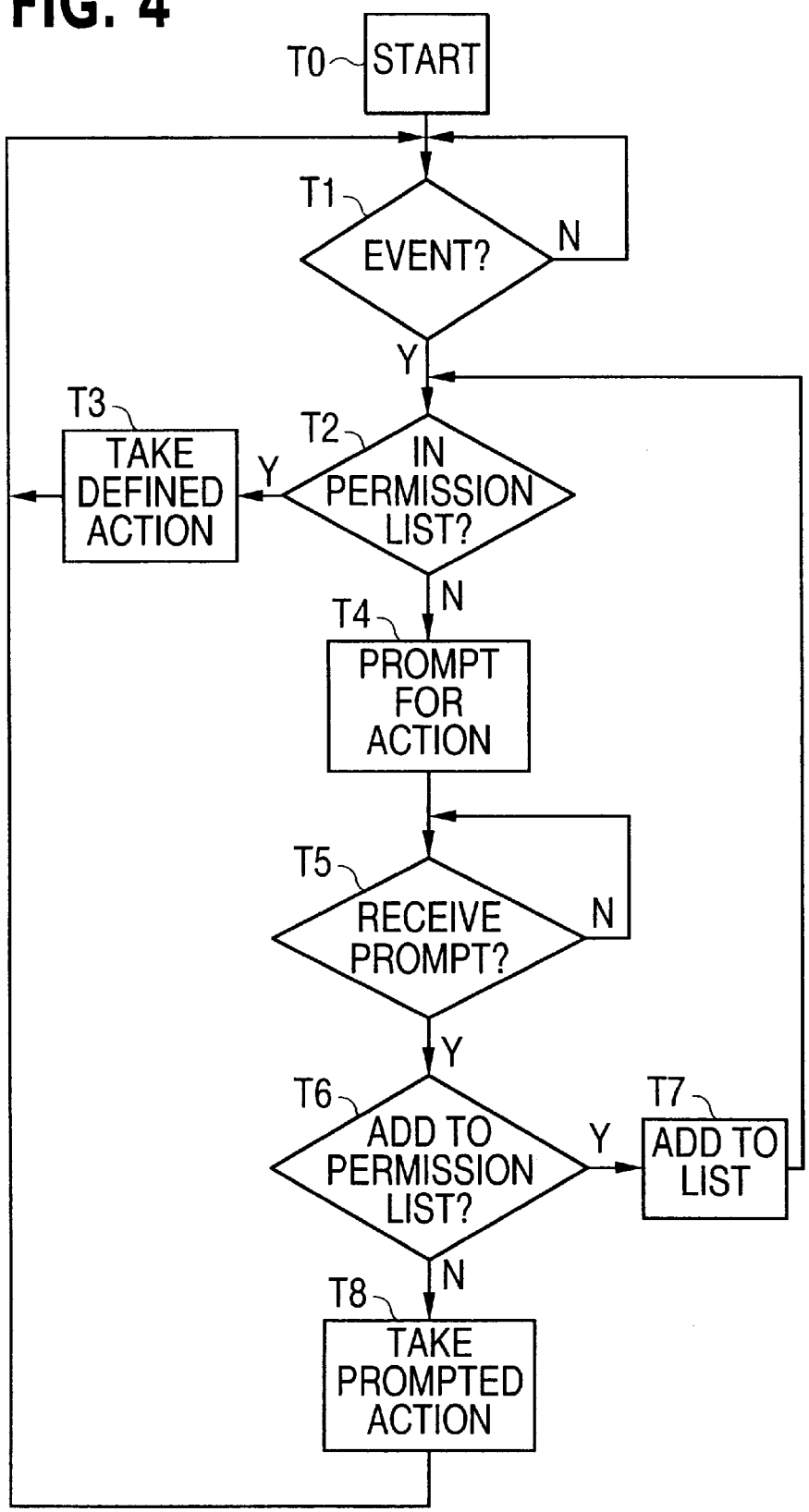

FIG. 4 is a flow chart of another exemplary method in accordance with the present invention. Upon turn on of computer system 20, the computer security method starts operation in step T0, and in step T1 when event detector 40 detects an event on event list 46, the flow advances to step T2 in which decision maker 42 determines whether the event is on a permitted list in permission category list 48. As one example, user X having "permission category=2)" may attempt to install a new program onto the computer system from a set of disks. Such activity may have a high permission category (e.g., "3") in order to protect the computer system against users attempting to load unauthorized programs (e.g., games) using unknown and possibly virus-infected disks. If the event is on the event list 46 and has allowable permission, then in step T3 action generator 44 takes the desired action as indicated on action list 50, and the flow returns to step T1 to await the next event. If the event (as in the present example) does not have permission, then from step T2 the flow moves to step T4 to cause a prompt for action to be taken.

When step T5 determines that a prompt has been received, step T6 determines whether the event is to be added to the permitted list in permission category list 48. If so, then in step T7 the event is added to the list, and the flow returns to step T2 which then checks to see whether the event is on the permitted list. Since the event has just been added to the permitted list, flow advances to step T3 to take the defined action and return to step T1. Alternatively, action to be taken might include making a record of the number of times the event occurs and the action that is prompted, with the system automatically adding the event to the permitted list after the failure to automatically provide permission has been overridden a specified number of times. If step T6 determines that the event is not to be added to the permitted list, then in step T8 the action that was prompted at step T5 is taken, and flow returns to step T1 to await the next event.

Instead of the exemplary arrangement illustrated with respect to FIG. 6, the permission category list 48 may be arranged to list various events according to differing permission categories, whereas action list 50 may be arranged to list differing procedures or levels of security to be applied to differing categories (as opposed to differing events). For example, events designated with a permission=1, may be handled with a low level of security procedure.

Figure 5:
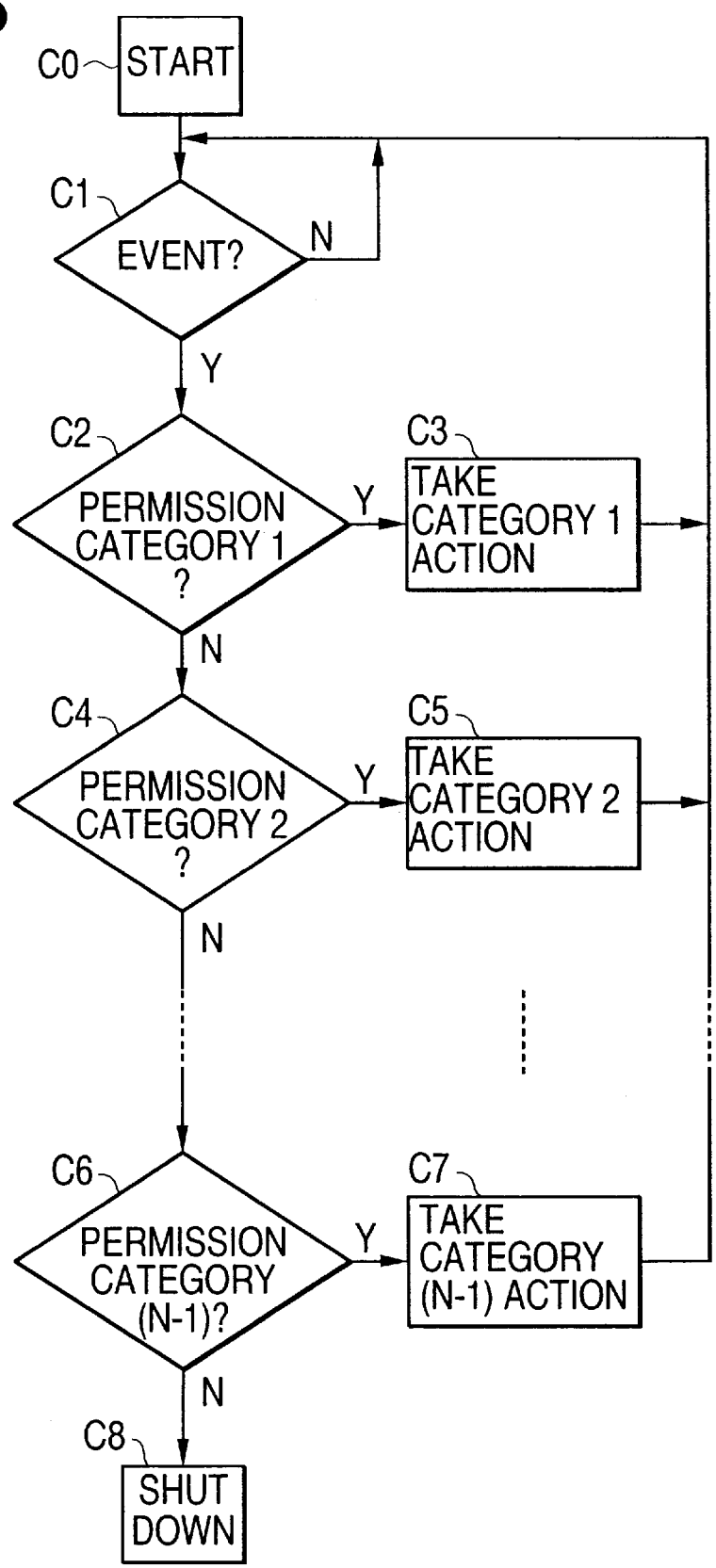

FIG. 5 is a flow chart of another exemplary computer security method in accordance with the present invention in which permission category list 48 lists various events according to differing permission categories, and takes action according to differing action categories (not shown in the drawings). Once again, once the computer security method is started in step C0, event detector 40 determines whether an event has been detected in step C1. When an event is detected, decision maker 42 determines in step C2 whether the event is in a permission category 1 within permission category list 48. If so, then in step C3 action generator 44 takes category 1 action designated for category 1 events, and the flow returns to step C1 to await the next event.

If step C2 determines that the event is not in permission category 1, then in step C4 it is determined whether the event is in permission category 2. If so, then in step C5 category 2 action is taken by action generator 44, and flow returns to step C1 to await the next event. If the event is not in permission category 2, then flow continues checking further permission categories within permission category list 48 until the event is found in a permission category or until the last category authorizing action is reached, indicated in step C6 as permission category (N−1). If the event is in that permission category, then in step C7, category action (N−1) for that category (N−1) is taken (e.g., sound alarm), and flow returns to step C1 to await the next event. If the event is not in that last permission category, then from step C6, the flow moves to step C8, for example, to shut down the monitored computer system.

The various action categories to be taken can depend upon the severity of the event. Thus, in an exemplary computer system in accordance with the present invention, category 1 action might be to permit the event every time permission is requested, category 2 might be to permit the event one time only, category 3 might permit the event only for particular processes, category 4 might refuse the event for certain processes, category 5 might refuse the event always, category 6 might kill the particular process, and category 7 might shut down the computer. Additional or alternative actions might be included. Any of these categories might also include reporting the event.

It is thus seen that in accordance with the present invention, a computer security system is provided in which an event detector detects events in a monitored computer system, a permission category list lists permission categories for events, and a decision maker determines action to be taken in response to detection of an event, based on the permission category of the detected event.

Although the present invention has been described with reference to a number of illustrative embodiments thereof, it should be understood that numerous other modifications and embodiments can be devised by those skilled in the art having the benefit of this invention that will fall within the spirit and scope of the principles of the invention. More particularly, reasonable variations and modifications are possible in the component parts and/or arrangements within the scope of the foregoing disclosure, the drawings and the appended claims, without departing from the spirit of the invention. In addition to variations and modifications in the component parts and/or arrangements, alternative uses and/or environments will also be apparent to those skilled in the art, especially as technology develops in the future.

What is claimed is:

1. A computer security system, comprising:
    an event detector for detecting events in a monitored computer system;
    a permission category list listing permission categories for events; and
    a decision maker for determining an action to be taken by the computer security system in response to detection of an event, based on the permission category associated with the detected event.

2. A computer security system as claimed in claim 1, wherein said event detector includes an event list listing events to be detected, said permission category list lists permission categories for the events on said event list, and said decision maker prohibits events not on said permission category list.

3. A computer security system as claimed in claim 1, wherein said decision maker includes an action list listing actions to be taken in response to different permission categories of detected events.

4. A computer security system as claimed in claim 1, further comprising an action generator for initiating the determined action.

5. A computer security system as claimed in claim 1, wherein the monitored computer includes a processor, and said event detector detects processor events.

6. A computer security system as claimed in claim 1, wherein the monitored computer includes an input device, and said event detector detects input events.

7. A computer security system as claimed in claim 1, wherein the monitored computer includes an output device, and said event detector detects output events.

8. A computer security system as claimed in claim 1, wherein said permission category list comprises a look up table.

9. A computer security system as claimed in claim 8, wherein said action generator includes means for assigning a permission category for the detected event and for adding the detected event to the assigned permission category in said look up table.

10. A computer security system as claimed in claim 4, wherein said action generator includes means responsive to the detected event not being on said permission category list for assigning a permission category for the detected event and for adding the detected event to the assigned permission category in said permission category list.

11. A computer system, comprising:
    a processor to perform processor events by doing processing functions;
    a memory to store a program for controlling the processing functions, data for use in the processing functions, and data resulting from the processing functions;
    an input device to perform input events by inputting data for use in the processing functions and commands for initiating processing functions;
    an output device to perform output events by outputting data resulting from the processing functions;
    an event detector to detect processing events, input events, and output events in said computer system;
    a permission category list listing permission categories for processing events, input events, and output events; and
    a decision maker to determine action to be taken by the processor in response to detection of a processing event, an input event, or an output event, based on the permission category of the detected event.

12. A computer system as claimed in claim 11, wherein said event detector includes an event list listing events to be detected, said permission category list lists permission categories for the events on said event list, and said decision maker prohibits events not on said permission category list.

13. A computer system as claimed in claim 11, wherein said decision maker includes an action list listing actions to be taken in response to different permission categories of detected events.

14. A computer system as claimed in claim 11, further comprising an action generator for initiating the determined action.

15. A computer security system as claimed in claim 11, wherein said permission category list comprises a look up table.

16. A computer system as claimed in claim 11, wherein said action generator includes means for assigning a permission category for the detected event and for adding the detected event to the assigned permission category in said permission category list.

17. A computer security program encoded on a tangible medium for causing a computer to perform:
    (a) detecting an event related to a particular computer process;
    (b) determining a permission category for the detected event;
    (c) when the detected event is determined to be in a first permission category, allowing performance of the detected event; and
    (d) when the detected event is determined to be in a second permission category, preventing performance of the detected event.

18. A computer security program as claimed in claim 17, wherein said detecting comprises detecting at least one of a processor event, an input event, and an output event.

19. A computer security program as claimed in claim 17, wherein said determining comprises determining whether the detected event is on a permission list.

20. A computer security program as claimed in claim 19, wherein when the detected event is not on the permission list, said program causes the computer to perform:
    (e) detecting an override instruction; and
    (f) allowing performance of the detected process.

21. A computer security program as claimed in claim 20, wherein said program causes the computer to perform:
    (g) adding the detected event to the permission list.

22. A computer security program as claimed in claim 17, wherein when the detected event is determined to be in the second permission category, said program causes the computer to perform:
    (e) detecting an override instruction; and
    (f) allowing performance of the detected process.

23. A computer security program as claimed in claim 22, wherein said program causes the computer to perform:
    (g) changing the permission category of the detected event to the first permission category.

24. A computer security program as claimed in claim 17, wherein said determining comprises determining whether the event is in a lookup table.

25. A computer security program as claimed in claim 24, wherein the lookup table lists permitted events.

26. A computer security method, comprising:
   (a) detecting an event related to a particular computer process;
   (b) determining a permission category for the detected event;
   (c) when the detected event is determined to be in a first permission category, allowing performance of the particular computer process; and
   (d) when the event is determined to be in a second permission category, preventing performance of the particular computer process.

27. A computer security method as claimed in claim 26, wherein when the detected event is determined to be in the second permission category, said method further comprises:
   (e) detecting an override instruction; and
   (f) allowing performance of the particular computer process.

28. A computer security method as claimed in claim 27, further comprising:
   (g) changing the permission category of the detected event to the first permission category.

\* \* \* \* \*